(12) United States Patent
Rauser et al.

(10) Patent No.: US 9,197,495 B1
(45) Date of Patent: Nov. 24, 2015

(54) DETERMINING LOCATIONS OF NETWORK FAILURES

(71) Applicant: Amazon Technologies, Inc., Reno, NV (US)

(72) Inventors: John Michael Rauser, San Francisco, CA (US); Sonali Roy, Seattle, WA (US); James Michael Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 13/764,706

(22) Filed: Feb. 11, 2013

(51) Int. Cl.
*H04L 12/24* (2006.01)
*H04L 12/26* (2006.01)

(52) U.S. Cl.
CPC ............ *H04L 41/0677* (2013.01); *H04L 43/08* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 5,864,662 A | 1/1999 | Brownmiller et al. | |
| 6,185,612 B1 | 2/2001 | Jensen et al. | |
| 6,654,914 B1 | 11/2003 | Kaffine et al. | |
| 6,671,818 B1 | 12/2003 | Mikurak | |
| 6,694,455 B1 | 2/2004 | Scrandis | |
| 6,738,933 B2 | 5/2004 | Fraenkel et al. | |
| 6,823,479 B1 | 11/2004 | McElhaney et al. | |
| 6,901,530 B2 | 5/2005 | Cerami et al. | |
| 6,909,741 B1 | 6/2005 | Smith et al. | |
| 6,978,302 B1 | 12/2005 | Chisholm et al. | |
| 6,981,039 B2 | 12/2005 | Cerami et al. | |
| 7,016,313 B1 | 3/2006 | Harper | |
| 7,134,135 B2 | 11/2006 | Cerami et al. | |
| 7,251,055 B2 | 7/2007 | Sawada et al. | |
| 7,260,060 B1 | 8/2007 | Abaye et al. | |
| 7,385,924 B1 | 6/2008 | Riddle | |
| 7,441,154 B2 | 10/2008 | Klotz et al. | |
| 7,546,609 B2 | 6/2009 | Florissi et al. | |
| 7,609,650 B2 | 10/2009 | Roskowski et al. | |
| 7,706,373 B2 | 4/2010 | Xu et al. | |
| 7,751,350 B1 | 7/2010 | Pabst | |
| 7,788,536 B1 | 8/2010 | Qureshi et al. | |
| 7,844,730 B2 | 11/2010 | Kawaguchi | |
| 7,936,694 B2 | 5/2011 | Choudhury | |
| 7,949,739 B2 | 5/2011 | Florissi et al. | |

(Continued)

OTHER PUBLICATIONS

Tsang, Yolanda et al., "Passive network tomography using EM algorithms", 2001 IEEE International Conference on Acoustics, Speech, and Signal Processing, Proceedings, vol. VI, May 2001.*

(Continued)

*Primary Examiner* — Faruk Hamza
*Assistant Examiner* — Cassandra Decker
(74) *Attorney, Agent, or Firm* — Knobbe, Martens, Olson & Bear, LLP

(57) ABSTRACT

Generally described, systems and methods are provided for detecting locations of failures of network paths. The system collects information from a plurality of nodes and links in a network, aggregates the collected performance information across paths in the network, processes the aggregated performance information for detecting failures on the paths, and determines at least one location for network failures. In some aspects, processing the aggregated information may include determining the performance information on each of the nodes and links in the network. The performance information on each of the nodes and links may be determined by application and optimization of an objective function.

18 Claims, 9 Drawing Sheets

(56) References Cited

U.S. PATENT DOCUMENTS

| | | | |
|---|---|---|---|
| 7,953,020 | B2 | 5/2011 | Breslau et al. |
| 8,223,655 | B2 | 7/2012 | Heinz et al. |
| 8,300,554 | B1 | 10/2012 | Vijendra et al. |
| 8,375,244 | B2 | 2/2013 | Bobak et al. |
| 8,433,894 | B2 | 4/2013 | Reznik et al. |
| 2002/0010735 | A1 | 1/2002 | McMillen et al. |
| 2002/0016856 | A1 | 2/2002 | Tallegas et al. |
| 2002/0107980 | A1 | 8/2002 | Kawaguchi |
| 2004/0044764 | A1* | 3/2004 | Padmanabhan et al. ...... 709/224 |
| 2004/0044765 | A1* | 3/2004 | Meek et al. .................... 709/224 |
| 2005/0091361 | A1 | 4/2005 | Bernstein et al. |
| 2005/0169185 | A1 | 8/2005 | Qiu et al. |
| 2005/0210132 | A1 | 9/2005 | Florissi et al. |
| 2006/0007870 | A1 | 1/2006 | Roskowski et al. |
| 2008/0186866 | A1 | 8/2008 | Morinaga et al. |
| 2008/0205263 | A1 | 8/2008 | Cooley et al. |
| 2008/0253295 | A1 | 10/2008 | Yumoto et al. |
| 2008/0298271 | A1 | 12/2008 | Morinaga et al. |
| 2009/0037771 | A1 | 2/2009 | Morse et al. |
| 2009/0067483 | A1 | 3/2009 | Casas et al. |
| 2009/0086643 | A1 | 4/2009 | Kotrla et al. |
| 2009/0116404 | A1 | 5/2009 | Mahop et al. |
| 2009/0271513 | A1 | 10/2009 | Liu et al. |
| 2009/0285101 | A1 | 11/2009 | Lu |
| 2009/0290497 | A1 | 11/2009 | Gibbings |
| 2010/0067396 | A1 | 3/2010 | Cui et al. |
| 2010/0121910 | A1 | 5/2010 | Kim |
| 2010/0157516 | A1 | 6/2010 | Doorhy et al. |
| 2010/0278056 | A1 | 11/2010 | Meloche et al. |
| 2011/0007629 | A1 | 1/2011 | Atlas et al. |
| 2011/0063979 | A1 | 3/2011 | Matthews et al. |
| 2011/0063986 | A1 | 3/2011 | Denecheau et al. |
| 2011/0078291 | A1 | 3/2011 | Bickson et al. |
| 2011/0096675 | A1 | 4/2011 | Li et al. |
| 2012/0109600 | A1 | 5/2012 | Saeed et al. |
| 2012/0182864 | A1 | 7/2012 | Heinz et al. |
| 2012/0213224 | A1 | 8/2012 | Chen |
| 2012/0239256 | A1 | 9/2012 | Hammerschmidt et al. |
| 2012/0320784 | A1 | 12/2012 | Edwards et al. |
| 2012/0327765 | A1 | 12/2012 | Gibbings |
| 2013/0070612 | A1 | 3/2013 | Timus et al. |
| 2013/0117272 | A1 | 5/2013 | Barga et al. |

OTHER PUBLICATIONS

Batsakis, Alexandros et al., "Practical Passive Lossy Link Inference", Proc. of PAM 2005, 2005.*

Tachibana, Atsuo et al., "Empirical study on locating congested segments over the Internet based on multiple end-to-end path measurements", Proc. IEEE/IPSG International Symposium on Applications and the Internet (SAINT 2005), Jan. 2005.*

Bu, Tian et al., "Network tomography on general topologies", Proc. of the ACM SIGMETRICS, Jun. 2002.*

Sauro, Jeff, "What's a Z-score and why use it in usability testing?", http://www.measuringusability.com/z.htm, Sep. 17, 2004.*

Kniaz, Krzysztof, "Non-gradient optimization techniques (Nelder-Mead and Rosenbrock)", http://www.kniaz.net/software/rosnm.aspx, May 2009.*

Salakhutdinov, Ruslan, et al., "Optimization with EM and Expectation-conjugate-gradient", Proceedings of the Twentieth International Conference on Machine Learning (ICML-2003), Washington DC, 2003.*

Cavanagh et al., Determining Locations of Network Failures, U.S. Appl. No. 13/441,179, filed Apr. 6, 2012.

* cited by examiner

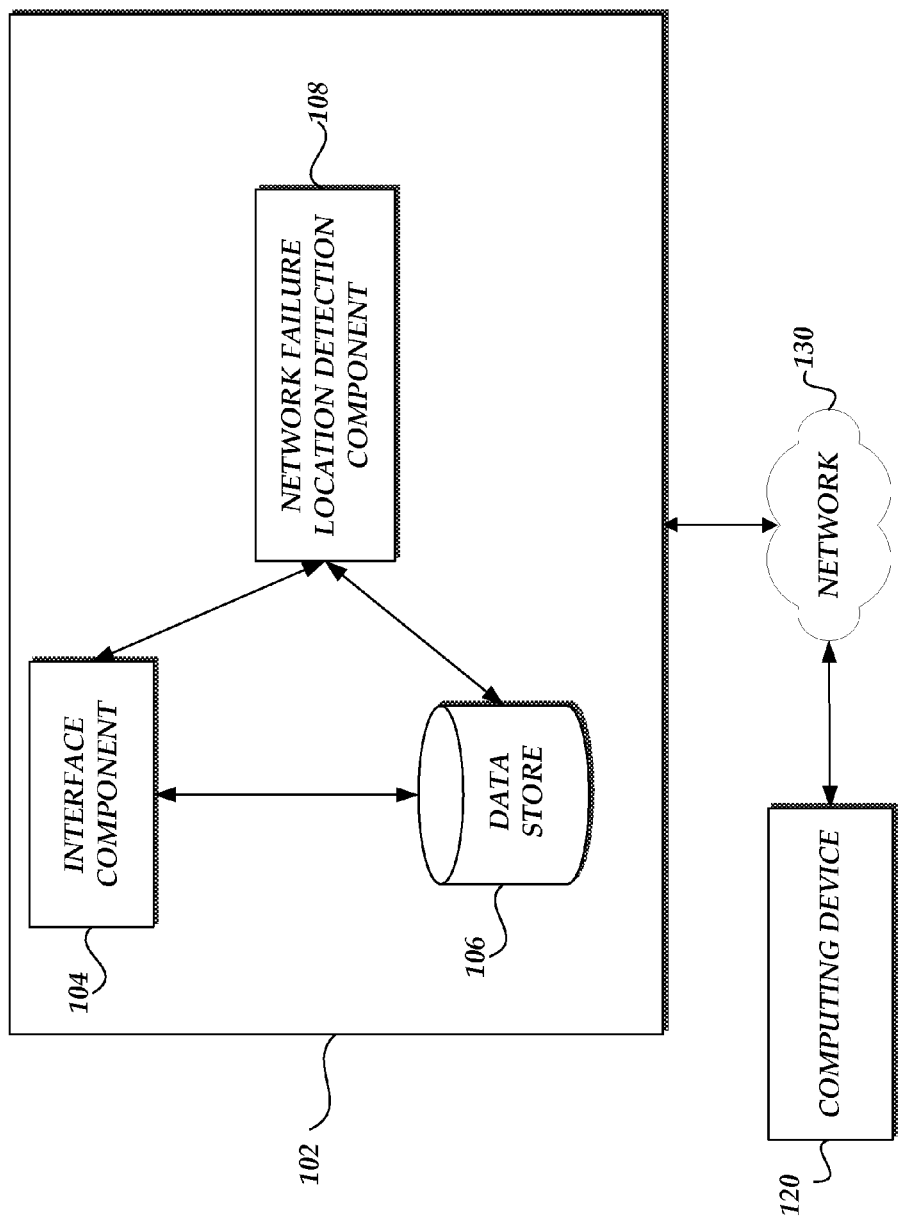

DETERMINING LOCATIONS OF NETWORK FAILURES

BACKGROUND

Computer networks generally comprise various interconnected computing devices that can exchange data. Computing devices in a computer network can be in direct communication with one or more other computing devices. Each direct communication connection between computing devices in a computer network is generally referred to as a network link, or link. While a computer network is generally made up of a number of links, computing devices in a computer network do not typically include links to every other computing device in a computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an origin computing device to an identified destination computing device. If a packet of data is received by a computing device that is not the identified destination computing device, the receiving computing device becomes an intermediary in the communication path between the origin computing device and the destination computing device by forwarding the packet to another computing device in the computer network. Accordingly, each packet of data is transmitted through a series of intermediate links in the computer network until the packet reaches its destination computing device. The series of links for delivery of a packet of data between an origin computing device and a destination computing device is generally referred to as a network path, or a path.

At each computing device in a communication network, an independent decision may be made regarding the path to the identified destination computing device for each received data packet. Each computing device can use several factors for making the decision regarding the path to the identified destination. For example, in some networks, portions of the destination address included in the data packet may be used to compare to a lookup table on the computing device. Based on the independent decision, a receiving computing device transmits a received data packet on the next intermediate link in the path.

Indications of total traffic on any one link in the network may be obtained by measuring packets transmitted or received on the two computing devices connected by that link. As networks become increasingly complex, network operators may desire to obtain information regarding the performance of paths in the network, rather than indications of total traffic on individual links. The performance of paths in the network may include a view of the interconnection between all the computing devices in the network. Performance of the paths may also include indications of network availability or failures, which may include an indication of dropped or lost packets, an indication of service degradation, or even of a network halt due to excessive traffic.

Network operators generally wish to ensure the highest availability possible for their network at the lowest cost possible. Problems relating to network failures generally affect the availability of the networks, and the costs associated with resolving the network failures affect the operators' overall costs. Network operators typically wish to be able to accurately estimate the location of failures in their networks as quickly as possible in order to maintain costs low and availability high. The location of failures may be, for example the devices or links whose failure or impaired operation is resulting in packets not reaching their desired destinations. There exist various tools to detect when network failures occur on a network. However, it may be difficult to find the location of those failures. For example, in some situations, several different components in the network may be affected by the same cause of failure. In other situations, several causes of failures may affect the same network component. In either of these circumstances, a network failure should be detected. As networks increase in size and complexity, determining the location of those failures becomes more difficult.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1A is a block diagram depicting an illustrative embodiment of a computing environment implementing a network failure location determination system;

DETAILED DESCRIPTION

Figure 1B:
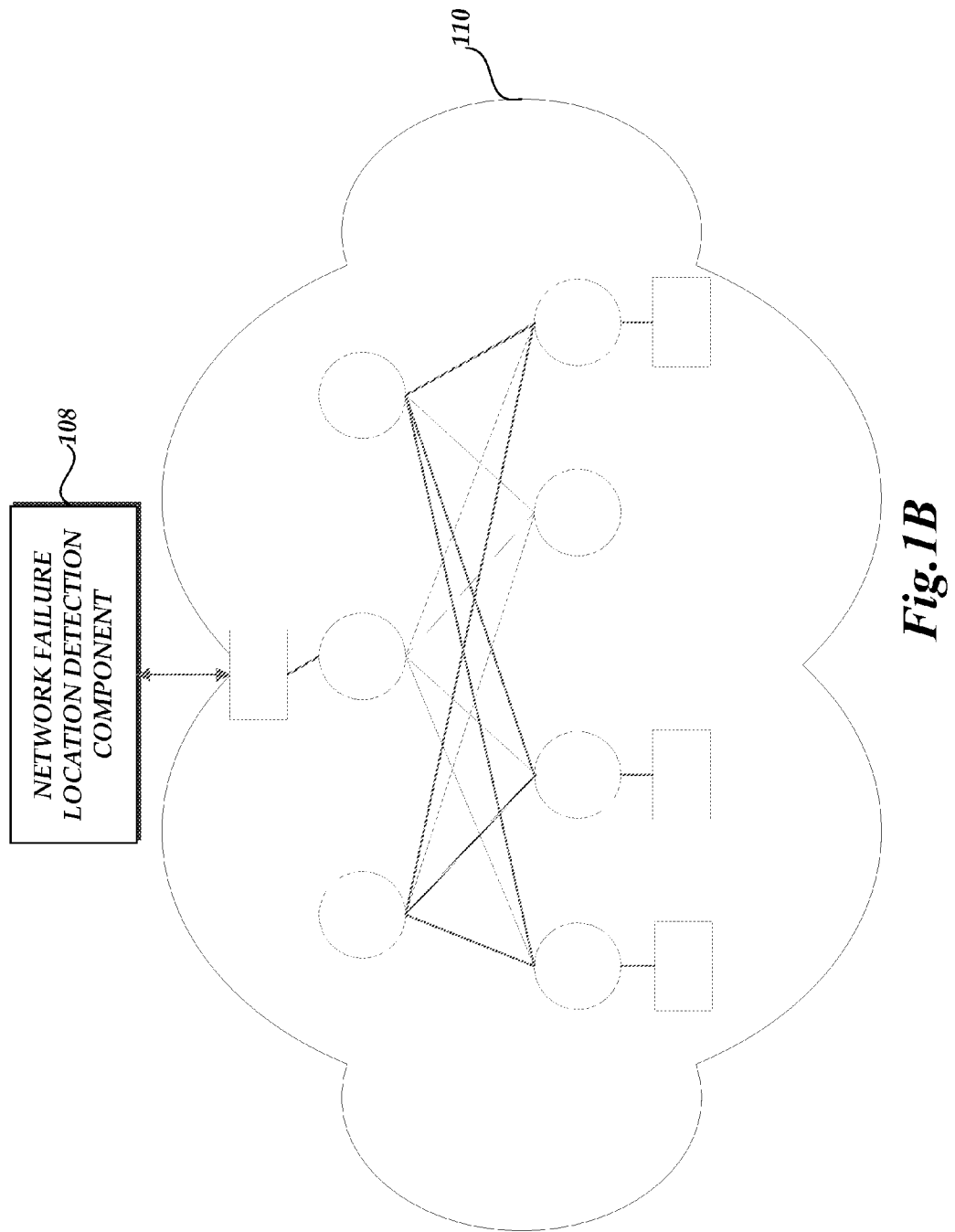
FIG. 1B is a block diagram depicting an illustrative interconnection between a network failure location detection component and a network of interconnected nodes.

Generally described, aspects of the present disclosure relate to the management of information related to locations of network failures. As discussed above, network operators may desire to associate network failures to faulty devices and links in the networks in order to take remedial action. Aspects of the present disclosure enable the finding of locations of failures in networks by identifying the affected or impaired devices and links in the networks.

Specifically, in one aspect, the network failure location detection system collects performance information from paths comprising a plurality of nodes and links in a network, and aggregates the collected performance information across paths in the network in order to isolate the failures to nodes and links of the network. The network failure location detection system then processes the aggregated performance information to detect failures on the paths. Once failures are detected, the system analyzes each of the detected failures to determine at least one affected or impaired device or link for each of the failures. In some aspects, processing the aggregated information by taking an independence assumption (which will be described below) includes the transformation of pathwise data into per-node and per-link data by solving a set of equations for the performance indications on each of a plurality of paths in the network using an objective function. The objective functions can include, but are not limited to, a least squares function, probability density distribution function, such as, for example, a binomial likelihood, a beta likelihood, a Bernoulli likelihood, and other objective functions.

The objective function can be solved using an optimization algorithm such as, for example, stochastic gradient descent (SGD), limited memory Broyden-Fletcher-Goldfarb-Shanno with bound constraint (L-BFGS-B), expectation-maximization (EM), non-gradient-based algorithms such as, for example, simulated annealing, and other optimization algorithms. In other aspects, by removing the independence assumption, processing the aggregated information may include using standard, or Z-scores. In some aspects, processing the aggregated information may include combining the results found by both the presence and the absence of the independence assumption.

Although various aspects of the disclosure will be described with regard to illustrative examples and embodiments, one skilled in the art will appreciate that the disclosed embodiments and examples should not be construed as limiting. In various embodiments, the information collected and aggregated from the network is processed by optimizing the objective function. In some embodiments, the objective function can describe a probability distribution of packet transfer rates for devices and/or links in a network. In other embodiments, the information collected and aggregated is processed without using an objective function, and instead processed using other techniques. For example, devices and/or links determined to be present in a larger than expected number of problematic paths may be classified as problematic devices and/or links. In yet other embodiments, the objective function and the other techniques may be combined, or other alternatives may also be used for processing the collected and aggregated information. These functions describe, at some level, the similarity between the pathwise data collected from the network and the pathwise data estimated from the current values of the per-node and per-link parameter estimates.

FIG. 1A is a block diagram depicting an illustrative embodiment of a computing environment 100 implementing a network failure location determination system 102. The network failure location determination system 102 includes a data store 106, an interface component 104 and a network failure location detection component 108. The depicted environment 100 also includes a client computing device 120 communicatively connected by a network 130, such as the Internet. Those skilled in the art will recognize that the client computing device 120 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone and the like. In some embodiments, the client computing device 120 may include computer hardware and software components. The computing environment 100 may also be collaborating with other network management systems in various data centers.

Figure 2A:
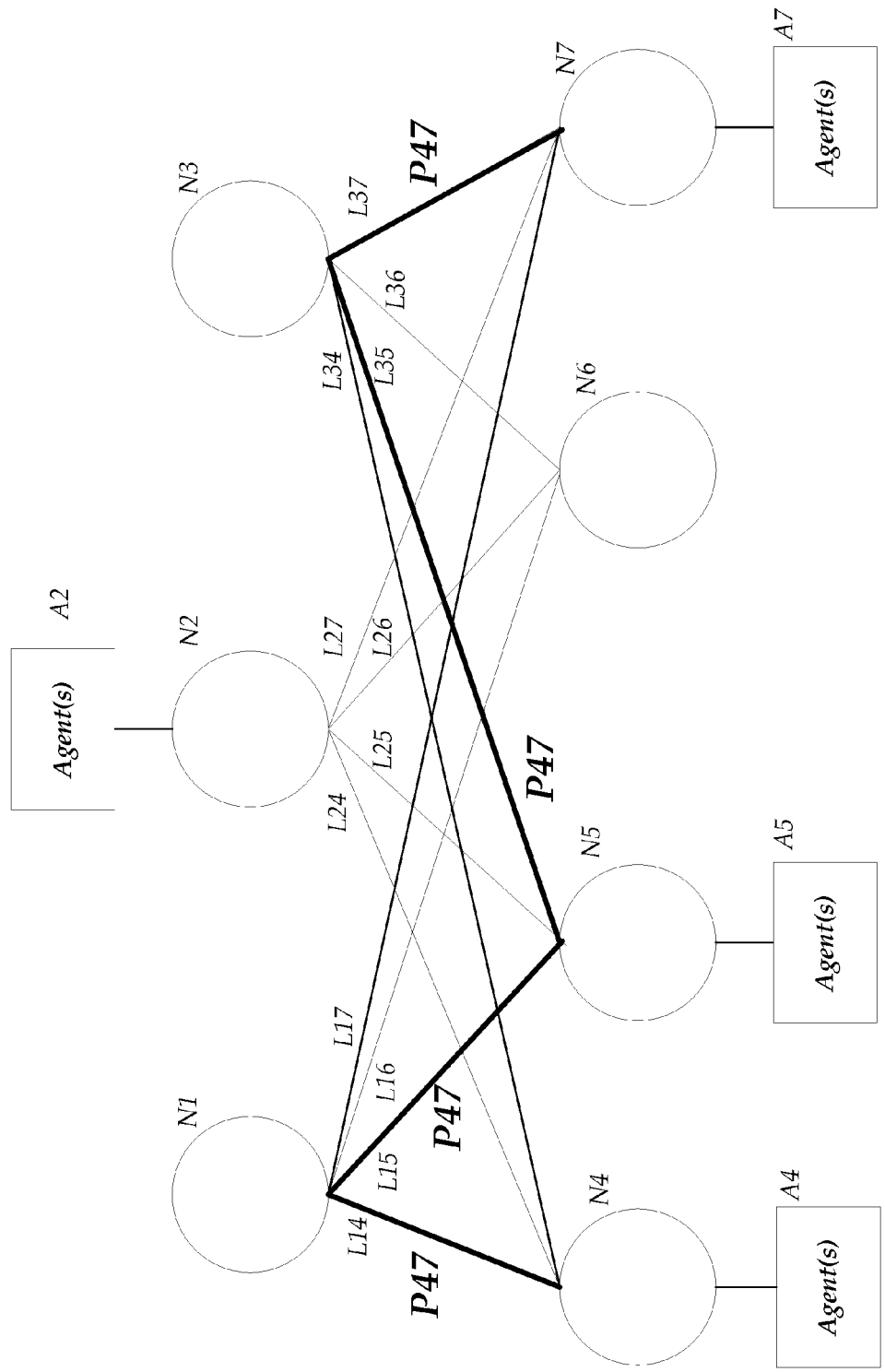
FIGS. 2A and 2B are schematic diagrams of an illustrative network topology defining various nodes, links and paths.
Figure 2B:
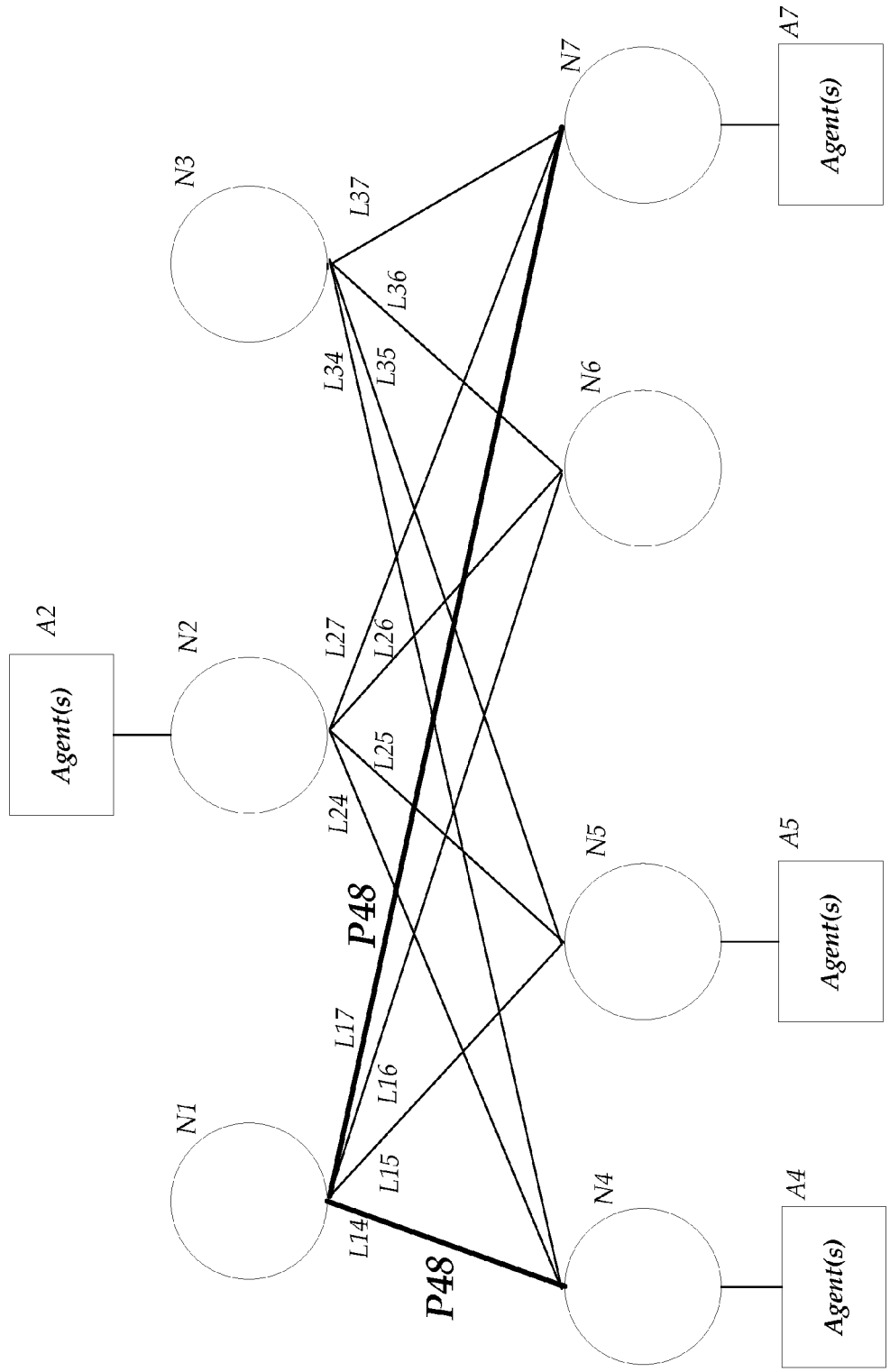

FIG. 1B is a block diagram depicting an illustrative interconnection between the network failure location detection component 108 and a network 110 of interconnected nodes. Illustratively, the network failure location detection component 108 of the network failure location determination system 102 may collect information from various nodes in a network 110 and aggregate the information collected. In various embodiments, the information collected may include paths taken between nodes in the network, as well as performance indices along the various paths. FIGS. 2A and 2B illustrate examples of nodes, links and paths. The performance indices may include loss, latency of packets (including one-way and round-trip latency), dropped packets, bandwidth of links and the like. Using the information collected and aggregated, the network failure location detection component 108 may process the information to determine the locations of packet losses or other failures observed in the network. The network failure location detection component 108 may also create a network topology, which may be made available to be displayed on a client computing device 120 through the interface component 104. In some embodiments, the interface component 104 may be in communication with the network failure detection component 108 by a network. The network failure location detection component 108 may also store information collected and aggregated into the data store 106 for later retrieval and use.

FIGS. 2A and 2B are schematic diagrams of nodes, links and paths in an illustrative network, such as for example network 110 illustrated in FIG. 1B. FIG. 2A illustrates nodes N1-N7, links L14-L17, L24-L27 and L34-L37, and path 47. As indicated, a direct connection between a pair of nodes consists of a link. Illustratively, nodes N1 and N4 are interconnected by link L14. Similarly, nodes N1 and N5 are interconnected by link L15. Illustratively, a connection between the nodes, such as link L14 between N1 and N4, may involve additional computing or networking components. However, such a link will be considered direct for the purposes of this disclosure.

In accordance with FIG. 2A, communications of data involves sending individual packets of data from an origin node (such as for example one of nodes N1-N7) to a destination node (such as for example another one of nodes N1-N7). A packet sent from an origin node to a destination node which is more than one link away from the origin node follows a path consisting of several links. For illustrative purposes, a packet from node N4 to node N7 may follow a path P47. Path P47 illustrated in FIG. 2A includes links L14, L15, L35 and L37.

Illustratively, the origin node does not specify the path in which a packet may or must travel. For illustrative purposes, for the packet travelling from node N4 to N7, N4 does not specify that the packet may or must travel through N1, N5 and N3. Rather, if a receiving node, such as node N1, which is an intermediary node, and is not the destination node N7, obtains a packet from N4, it transmits the packet to another node, such as N5 via a selected link, such as link L15. Accordingly, the results of each intermediary node (such as for example nodes N1, N5 and N3) forwarding a packet defines the path which the packet takes from N4 to N7. As such, the same intermediary node may forward successive packets along different links, which would result in the successive packets being forwarded to the destination node along different paths based on the selection of the link the intermediary node. With reference to FIG. 2B, another packet transmitted between node N4 and N7 may follow a path P48 including links L14 and L17. In contrast to path P47, the path P48 includes a path from node N4 to N1 and then to N7, with no other intermediary nodes.

One skilled in the relevant art will appreciate that networks monitored by the network failure location determination system 102 may include several more nodes than the illustrative network shown in FIGS. 2A and 2B. Accordingly, the number of potential paths and links between paths can vary greatly accordingly to the configuration of the nodes, generally referred to as the network topology.

FIGS. 2A and 2B also illustrate agents A2, A4, A5 and A7 associated with nodes N2, N4, N5 and N7. Each of the nodes in the network may be associated with an agent. The agent may be on the same device as the node, or on a separate device. In various aspects, the network failure location determination system 102 selects certain nodes, such as nodes N2, N4, N5 and N7, in the network 110 to act as transmitters of messages to other nodes in the network 110 in order to test the reachability of those other nodes. The messages sent to the other nodes may consist of content-less messages. In some embodiments, the transmitters may use User Datagram Protocol (UDP) packets to send the content-less messages. In other embodiments, Transmission Control Protocol (TCP), Internet Control Message Protocol (ICMP), Infiniband (IB) or other types of packets may be used. The agents A2, A4, A5 and A7 associated with each of the nodes N2, N4, N5 and N7 may be used to transmit the content-less messages, to respond to the messages sent from transmitters, and also to collect responses received. The network failure location determination system 102 may then measure the round-trip time for messages sent from the transmitting nodes based on the response received from the agents. The network failure location determination system 102 may also measure the loss of packets between transmitting nodes and receiving nodes, by measuring packet transfer rates (PTR). Illustratively, the PTR may be represented by the percentage of packets transmitted from a source node which are successfully received by the destination node. Similarly, the packet loss rate (PLR) may be the percentage of packets transmitted from a source node which are not successfully received by the destination node.

Figure 3:
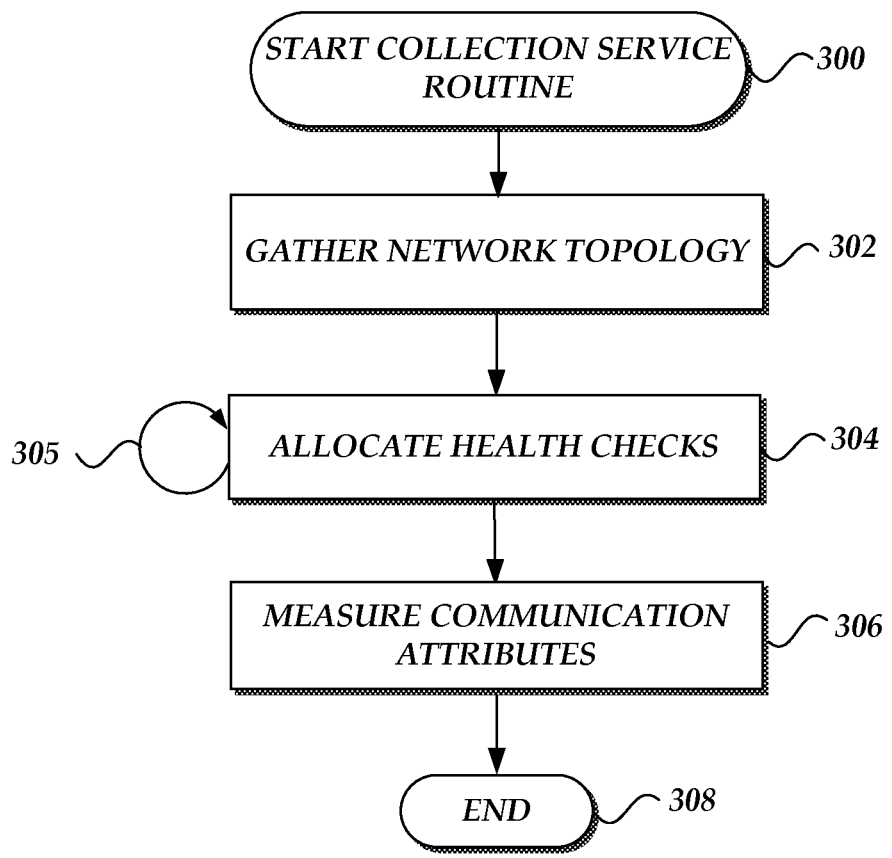
FIG. 3 is a flow diagram depicting an illustrative routine for collecting information from nodes in a network.

FIG. 3 is a flow diagram depicting an illustrative routine 300 for collecting information from nodes in a network. One skilled in the relevant art will appreciate that actions/steps outlined for routine 300 may be implemented by one or many computing devices/components that are associated with the network failure location detection component 108 (FIG. 1). Accordingly, the routine has been logically associated as being generally performed by the network failure location detection component 108, and thus the following illustrative embodiments would not be considered as limiting.

At block 302, the topology of the network is gathered, in order to be used for network failure location detection, as described further in connection with the routine 400 illustrated in FIG. 4 below. Illustratively, the agents (such as A2, A4, A5 and A7 in FIGS. 2A and 2B) measure the route path and communication attributes through the network 110. Communication attributes may include various measurements such as, for example, transit times of packets sent through the network, packet transfer rate (PTR), and packet drop rate (PDR).

In order to determine whether there are any remaining paths for which data needs to be gathered, a rough knowledge of the network topology may be used. The rough knowledge of the network topology may be derived from querying router devices in the network to gather topology information such as information provided by various routing protocols, such as for example, Open Shortest Path First (OSPF) and Border Gateway Protocol (BGP). The rough knowledge of the topology may also be based on diagrams provided by network technicians. The diagrams provided may also be associated with various confidence levels. The rough knowledge of the topology may also be based on knowledge of the workflow of the build process for the network. For example, it may be known that the network was initially designed with a 100 nodes, and there was a planned expansion of a doubling of nodes in a given timeframe within a given geographic area. The topology may also be inferred from a combination of external sources, such as configuration files, technicians' information, automated switch building, subnet analysis, SNMP query information regarding run-time configuration states of devices, or other monitoring services. The topology of the network is gathered and stored. The topology may also be periodically validated to ensure it is up to date, and updated as necessary. Any topology changes observed may be used to trigger reallocation of health checks at block 304 described below. The topology gathered may be made available for display.

At block 304, health checks are allocated across the paths in the network. In one embodiment, in order to not overload links in the network with health check information, the network failure location detection component 108 determines a minimum number of health checks across the network that may be necessary to adequately cover potential paths in the network. The minimum number of health checks may be related to the size of the network. The minimum number of health checks may also be related to the network operator objectives, including the balance between overloading the network by running health checks and gathering sufficient data to triangulate issues with a given level of statistical power. The frequency of health checks may be set and adjusted in various ways. The frequency may be static, it may be manually adjusted, or it may also be dynamically adjusted based on business logic. The frequency of health checks may also be adjusted at block 305 based on topology changes observed in block 302 or based on frequency of such topology changes. The health check allocation may also be adjusted based on validation of the allocation strategy at block 404 described below with reference to FIG. 4. As described above, a path includes source and destination nodes, and a series of intermediate nodes and links between the nodes. Packets arriving at a node may await transmission to the next node according to the packet's protocol as handled by the node. If the memory of the node is full when a packet arrives, the packet may be discarded. Otherwise, the packet is held until it reaches the front of the queue and is then forwarded to the next node on the way to its destination. This waiting mechanism may be responsible for observed packet losses and for packet latencies. Other reasons may also contribute to packet losses or latencies.

A ping utility may be used to check if a remote device is operating and connected to another node in a network. The source device may send an Internet Control Message Protocol (ICMP) packet to the remote device's IP address. If the destination device is operating and the network links are healthy, the source device will receive a return an ICMP packet, unless configured to ignore such requests. Thus, the network failure location detection component 108 can collect data on roundtrip times and delays using the ping utility. Using other packet protocols, including for example TCP, UDP and the like, may have different advantages and may be used in various embodiments, which may be chosen based on the intended use cases of the network. In some embodiments, transmitting a message with UDP or TCP packets instead of ICMP packets provides the added advantage of being able to select the paths taken between two endpoints.

The network failure location detection component 108 may manipulate paths between the two endpoints by manipulating port numbers. For example, the network failure location detection component 108 may manipulate paths in accordance with flow preserving next-hop packet forwarding protocols such as Equal Cost Multi-Path (ECMP). With ECMP, and similar flow preserving packet forwarding strategies, at each node in the network, the decision on which path to take to send a packet to the destination computing device is done independently, and is deterministically dependent on the source port number, the destination port number, the source IP address, and the destination IP address. The use of UDP packets by the transmitters of the network failure location determination system 102 allows the packets to be re-routed as necessary to a path for which data needs to be gathered. The re-routing is enabled by manipulation of port numbers. Each node learns and takes a default flow through the nodes in the network to arrive at a given destination. By manipulating the destination port through the use of UDP packets, the intermediate packet forwarding devices can be forced into taking a different, desired path. Therefore, in the network failure location determination system 102, each link in the network 110 is covered by a sufficient number of paths in order to identify a failing link from a set of failing paths. The various paths covering a link may be achieved by using one or more of the agents on the nodes.

The strategy for allocating health checks across a network may include iterating through all the links in a network in order to meet a number of predetermined constraints. Examples of such constraints may include, for example, a minimum number of paths per link, or a maximum number of paths per link. In order to achieve a level of desired allocation coverage, the network failure location detection component 108 may add synthetic network traffic by sending probes from select agents in the network. It may be desirable to throttle the frequency of health checks to manage the load generated on network links. However, a minimum number of health checks are necessary for adequate coverage and monitoring of the network. In order to accurately measure packets dropped or lost on links to nodes, each node is tested for reachability at an ideal frequency designed to keep the amount of data generated by the transmission of the messages to a workable level while accurately measuring packet loss. In some embodiments, a health check may be initiated every 100 milliseconds, or every 500 milliseconds, or every 5 seconds, or every 5 minutes, or any other suitable period of time according to business and/or other requirements of the network supported service.

Using the network topology previously gathered, each link in the network is iterated through in order to ensure that at least one path traverses the link. If a path is successfully allocated to a given link, a counter for all links on a path may be incremented by a certain value. If however if a path is not allocated to a link yet, then the health check allocation may be adjusted to achieve a desired path until all links achieve a target number of paths per link.

Once the health checks are allocated (and adjusted), then, at block 306, the communication attributes across the network are measured. The communication attributes may be measured on one-way or on round-trip paths. Since the different paths of the network are discovered during topology gathering at block 302, the route followed by a data packet is known based on the combination of the source IP and port, and destination IP and port used in the packet. The time taken to send and receive the packet is recorded by the network failure location detection component 108. Once the communication attributes are measured on the various paths in the network 110, the routine ends at block 308.

Though the process described above may describe actions or events in a linear manner, the description is not meant to imply that linear execution of the process is required. One skilled in the art will appreciate that components of the process described above may be carried out in different orders than described above. In particular, such re-ordering may allow for an optimization using parallelization offered by a cloud-computing environment. As such, the description of the process above is intended to be descriptive of one example only.

Figure 4:
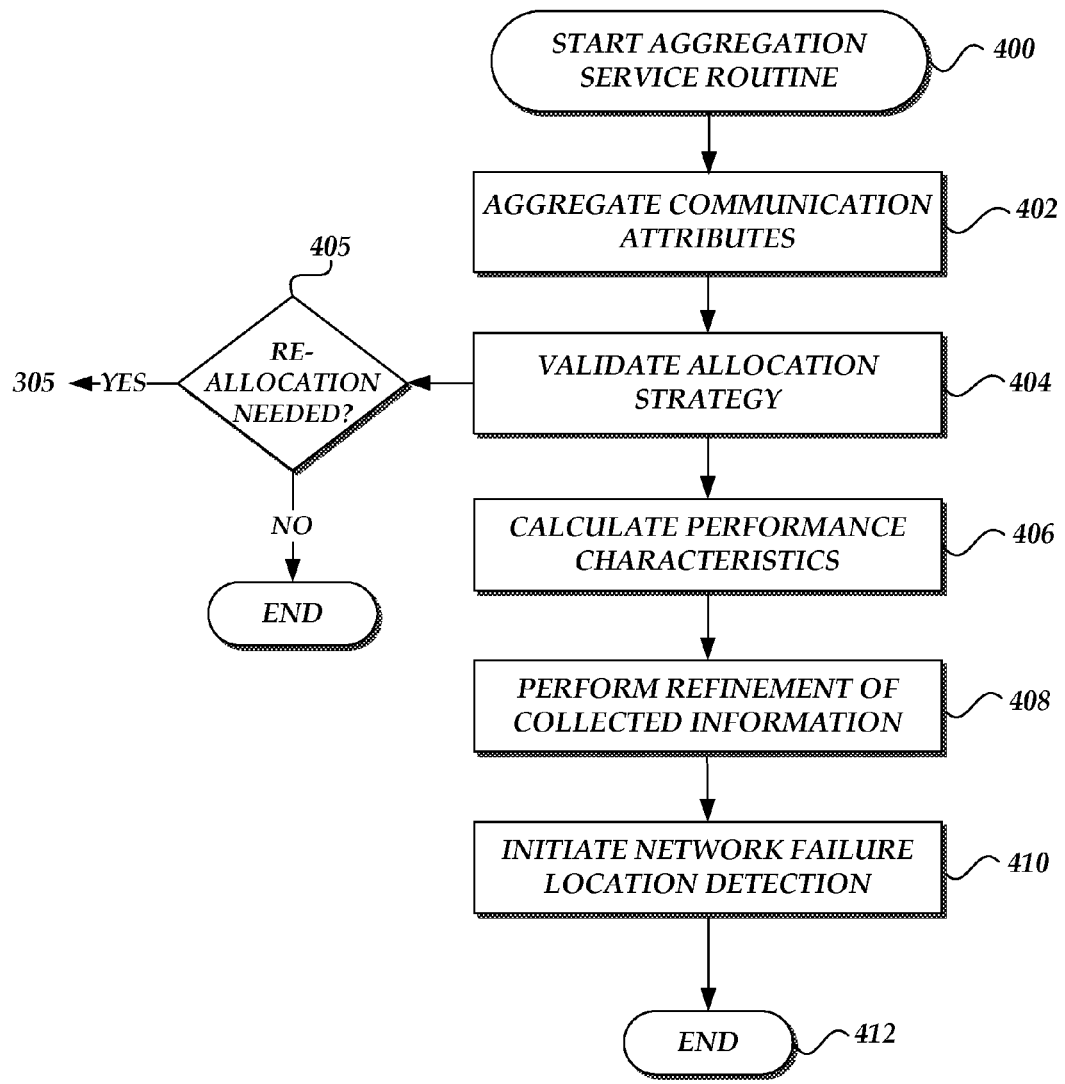
FIG. 4 is a flow diagram depicting an illustrative routine for aggregating information collected from nodes in a network.

FIG. 4 is a flow diagram depicting an illustrative routine 400 for aggregating information collected from nodes in the network 110 using the routine 300. One skilled in the relevant art will appreciate that actions/steps outlined for routine 400 may be implemented by one or many computing devices/components that are associated with the network failure location detection component 108. Accordingly, the routine has been logically associated as being generally performed by the network failure location detection component 108, and thus the following illustrative embodiments would not be considered as limiting.

At block 402, the communication attributes collected by each of the selected nodes are aggregated. Aggregation of the communication attributes enables reliable detection of failing paths. Data collected across several paths crossing the same node through different links or through packets sent from different transmitter nodes are aggregated. In some embodiments, the aggregation uses information from the gathered network topology.

At block 404 the communication attributes collected are used to determine whether the allocation strategy adopted is appropriate. The allocation strategy aims to provide adequate coverage of all the paths in the network. The communication attributes collected may indicate a need to adjust the allocation strategy in order to collect more path information. The health check frequency may thus be increased in some scenarios. In some scenarios, new paths may be allocated to one or more different agents on the networks. At block 405, if it is determined that the health checks need to be reallocated, then the loop 305 of the routine 300 may be repeated.

At block 406, using the communication attributes aggregated, the network failure location detection component 108 calculates performance characteristics for the paths, using the network topology gathered at block 302 of the collection service routine 300. Performance characteristics may include indications of packet transfer rate, packet loss, latency, throughput, jitter and the like. The aggregation service may store the information collected and aggregated in a data store such as data store 106 illustrated in FIG. 1. The aggregation service may also create visualizations to make available for display using the interface component 104 of FIG. 1. The visualizations may display the performance characteristics in tabular format. The performance characteristics may also be displayed on the network topology representation graph. In some aspects, the performance and health characteristics may be overlaid on the network topology by the use of different colors, textures or other User Interface (UI) visualization elements for different link health or performance indications.

Using the network topology gathered at block 302 of the collection service routine 300, the aggregation service may iterate through all the links in the network topology in order to compute a percentage of links and nodes which indicate a failure. The links and nodes may be sorted by failure percentage.

At block 408, the aggregation service performs refinement of the collected information. Having calculated the performance characteristics over the paths on the network, the aggregation service may, using knowledge regarding the network topology, refine the collected information to reduce the amount of information used to perform network failure location detection. For example, a criterion for refinement may be to only consider paths on the network through which a predetermined percentage of the packets are transmitted. Another criterion for refinement may be to only consider paths which exhibit packet loss exceeding a predetermined threshold. An illustrative example of refinement may be to only perform network failure location detection if a predetermined percentage of paths through a node or link drop more than a predetermined percentage of packets. Other criteria may also be used for refining the communication, and one or more criteria may be used in conjunction with others. In some embodiments, the refinement of collected information may not be performed, and all of the collected information may be used to perform network failure location detection.

At block 410 the aggregation service initiates a network failure location detection subroutine, examples of which are described with respect to FIGS. 5-7 below. Once the network failure location detection subroutine is initiated, the routine 400 ends at block 412.

Though the process described above may describe actions or events in a linear manner, the description is not meant to imply that linear execution of the process is required. One skilled in the art will appreciate that components of the process described above may be carried out in different orders than described above. As such, the description of the process above is intended to be descriptive of one example only.

Generally described, the network failure location detection component 108 processes the aggregated data to determine the location of the detected failures. Candidate failures may be fully determined by the inference process leading to a most likely location, or otherwise the aggregation service may perform additional queries or analysis to isolate locations of failures. In some embodiments, the cause may be attributable to multiple simultaneous events.

In some embodiments, network failure location detection may be performed by constructing a set of equations given a performance indication across a path given estimates on performance indication for each link and node in the path. This allows a numerical optimization method to solve for the performance indication for each link and node in the path given the data on the performance indication across paths. For example, one indication of performance may be packet transfer rate (PTR). Another indication of performance may be loss. The loss may be represented by a packet loss rate (PLR). In some embodiments, the PLR may be represented by the percentage of packets transmitted from one node and not successfully received by another node. In some embodiments, the PLR may be represented as 1-PTR.

In order to perform efficient network failure location detection, data for enough different paths needs to be collected, as indicated above. As the size of the network grows, the set of equations to be solved for becomes increasingly more complex. As information for more paths is collected, it becomes easier to isolate a link or a node in the network associated with a failure. However, such an increase in the number of paths may also lead to an increase in processing time.

Given the performance characteristics collected from various paths, a set of equations given an indication of performance across a path may be developed in order to solve for the performance indications for each link and node in the path. The health of each node and each link can be represented as a system of equations dependent on the network topology. The health of each node and link in the network can be determined by solving the system of equations in the context of the pathwise performance indication. In some embodiments, the performance indication can be data related to packet transfer rates. Therefore, in order to perform network failure location detection, data for enough different paths needs to be collected.

Given the collected data for the distinct paths on the network, the network may be modeled using a function. In some embodiments, the function may be an objective function such as, for example, a least-squares function (L2), a probability density distribution function such as, for example, a binomial likelihood function, a beta likelihood function, a Bernoulli function, and the like. Additional or alternative functions may also be used to model the network. Modeling the network may include representing the probability that a packet will successfully be transferred across any node or link in the network.

Once the network has been modeled with the function, the collected data may be used to fit parameters to the model. The fitting of the parameters may be accomplished by using an optimization algorithm such as, for example, stochastic gradient descent (SGD), limited memory Broyden-Fletcher-Goldfarb-Shanno with bound constraint (L-BFGS-B), expectation maximization (EM), non-gradient-based techniques such as, for example, simulated annealing, and other optimization methods. Using a least-squares function, the optimization algorithm may be used to minimize the difference between estimates of the performance characteristics represented by the model, and the actual performance characteristics collected from the network. Using a likelihood-based function, the optimization algorithm may alternatively be used to maximize the statistical likelihood of the actual performance characteristics collected from the network given the estimates of the performance characteristics represented by the model.

In various embodiments, network failure location detection is performed using optimization of likelihood functions, given inputs determined and collected from the network. For example, a probability model describing the probability that any device or link in the network will transmit a packet successfully can be established. Another probability model describing the joint probability of a packet being sent successfully across a path of the network, given the per-device and per-link packet transfer rates can also be established. Additionally, the number of packets sent and dropped on each path may be observed and collected from the network. Having established the probability models, the associated likelihood functions may be expressed as the probability of the data observed on the network given the parameters of the established models.

Therefore, a network failure location detection routine using optimization of likelihood function generally includes:
Initializing the parameters of the model (such as for example, the packet transfer rates) for a given likelihood function;
Calculating the likelihood function, which is calculating the probability of observing the packet transfer rate observed on a path given the parameters of the model and the number of packets sent and dropped on each path as observed and collected from the network;
Updating the parameters of the model using an optimization method;
Repeat calculating the likelihood function and updating the parameters again, as long as it is determined that the routine should not be terminated.

In various embodiments, the model may include a least squares model, a probability distribution model such as a binomial model, a beta model or others. In various embodiments, the optimization method may include a gradient-based method such as SGD, BFGS, and the like, a non-gradient based method, such as simulated annealing, an expectation-maximization (EM) method, or others. In the description below, the examples of the least squares model, the binomial model and the beta model, and the examples of the SGD, L-BFGS-B and EM methods are included for illustrative purposes.

Least Squares (L2) Model

Returning to FIG. 4, once the performance characteristics, such as, for example, the PTR across paths in the network are collected and aggregated, the PTR across a given path, or $PTR_{path}$, can be represented by the product of the PTR across each node and link across the path. In other embodiments, the latency across a given path may be represented by the sum of the latencies across each of the nodes and links. For simplicity, the nodes and links may be, individually and/or in combination, referred to as entities, and entities may be represented by e. Thus, the $PTR_{path}$ may be represented by the following equation:

$$PTR_{path} = \Pi_{e\ in\ path} PTR_e,$$

where $PTR_e$ represents the PTR across the respective entity.

Using information gathered across the paths, the PTR of a path may be an observed variable, whereas the PTR of each entity across the path cannot be observed. However, the PTR of each entity may be estimated.

The following equation may be used to represent the value to minimize in order to arrive at the most accurate estimates for the PTRs of each entity:

$$L_p = |PTR_p - \Pi_{e\ in\ path} PTR_e|^2,$$

where $L_p$ is the value to be minimized, $PTR_p$ is the observed PTR across a path, and $PTR_e$ is the estimated PTR across an entity.

The equation for $L_p$ simply represents the square error between the observed packet transfer rate and the estimated packet transfer rate across a path. In other embodiments, the equation for $L_p$ may be represented by the absolute value of the difference between the observed packet transfer rate and the estimated packet transfer rate across a path. In yet other embodiments, the function to be minimized might be represented by a different equation or function.

Optimization of the Least Squares (L2) Model

As described above, the objective function, such as the least squares model above, may be fitted using an optimization algorithm. Given the $L_p$ as set forth above, then the estimate of the PTR across an entity can be determined by iteratively solving the following equation:

$$PTR_{e\ in\ path} = PTR_e - \frac{\delta L_p}{\delta e},$$

where $-\delta L_p/\delta e$ may be referred to as the negative gradient.

As an illustrative example, SGD may be used to determine the locations of network failures by determining the packet transfer rate (PTR) associated with nodes and links in the network. This determination may be done by minimizing an objective function that measures the difference between the actual network per-path data and data simulated from per-node and per-link estimates. The SGD iterates several times between measuring the quality of fit between simulated and real data and updating per-node and per-link parameter estimates in order to minimize the objective function.

Figure 5:
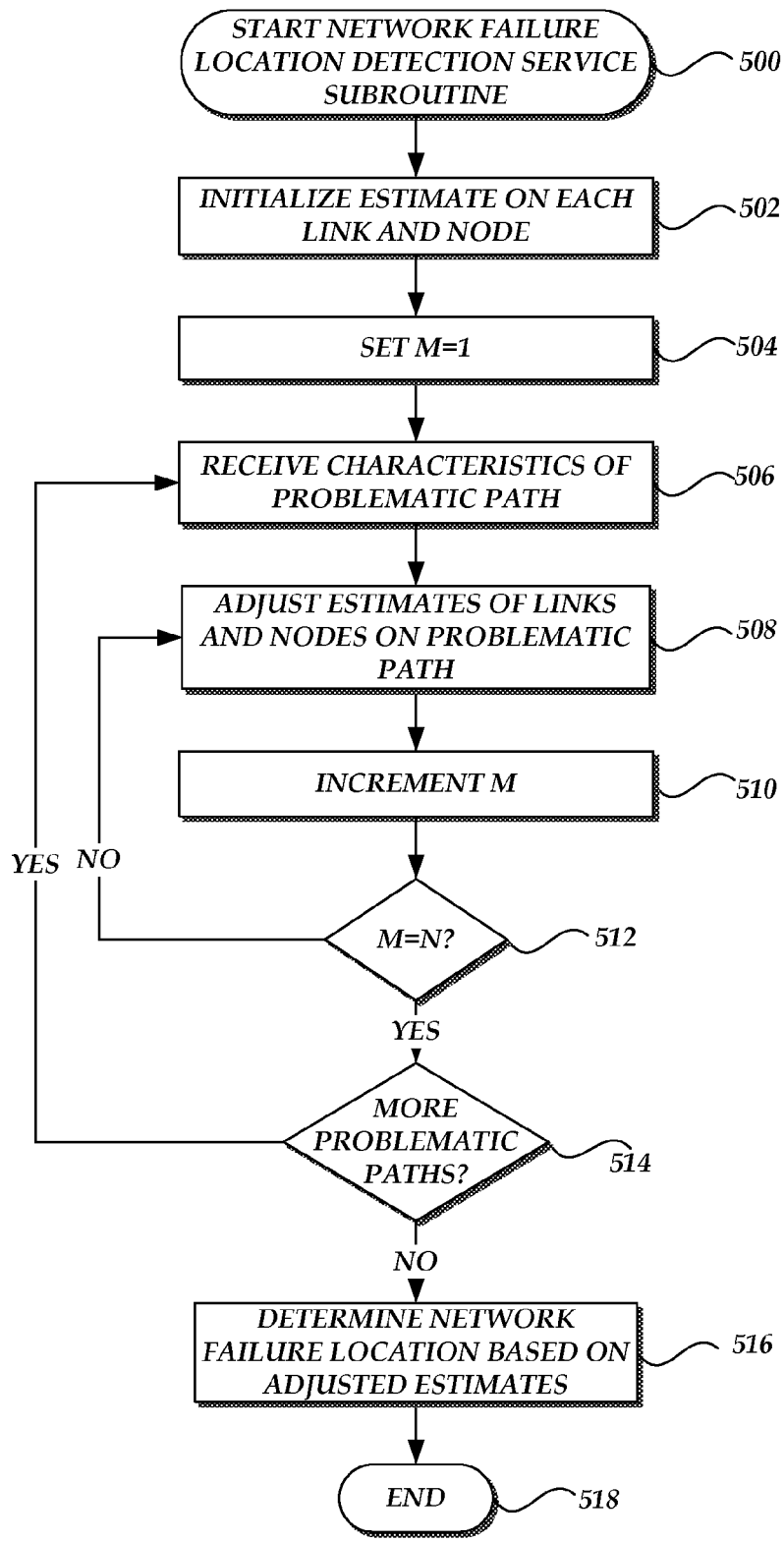
FIG. 5 is a flow diagram depicting an illustrative routine for detecting locations of network failures.

An example application of the least squares model optimized using SGD is illustrated in FIG. 5. FIG. 5 is a flow diagram depicting an illustrative subroutine 500 for detecting locations of network failures. One skilled in the relevant art will appreciate that actions/steps outlined for routine 500 may be implemented by one or many computing devices/components that are associated with the network failure location detection component 108. Accordingly, the routine has been logically associated as being generally performed by the network failure location detection component 108, and thus the following illustrative embodiments would not be considered as limiting.

In FIG. 5, a general "estimate" for links and nodes in a network is shown. In some embodiments, the estimate may correspond to an estimate of the packet transfer rate (PTR) across the links and nodes. The SGD process illustrated may also be used to solve for other performance characteristics on the nodes and links.

Starting at block 502, the network failure location detection component 108 initializes the estimate for a given performance characteristic for each link and node in the network. In some embodiments, this initialization may equate the estimate to zero. In other embodiments, the estimate may be equated to other values. For example, in some embodiments, the initial value may be set to the average value of the performance characteristic measured across the paths in the network. In other embodiments, the initial value may be set to the median value of the performance characteristic measured across the paths in the network. In other embodiments, the initial value may be set to a specific percentile of the values of the performance characteristic measured across the paths in the network, starting from the lowest or the highest of such measured values. The percentile may be the tenth, twentieth, thirtieth, fiftieth or any other percentile. Continuing with the example of the PTR, the PTR may be initialized to being zero across all links and nodes on the network.

Once the performance characteristic estimate is initialized on each link and node, the SGD process may be used to refine that estimate. In some embodiments, the SGD process may be iterated N times. N may be a global parameter for all optimization routines. N may be selected by the network operator for all cases, or it may be adjusted each time the network failure location detection subroutine is run. Referring to FIG. 5, at block 504, an iteration counter, M, is set to 1. Then, at block 506, performance characteristics of a path may be received as a result of the information calculated at block 406 and refined at block 408 described with reference to FIG. 4. For example, the network failure location detection component 108 may receive a calculated PTR for the path, which may be a value different from zero. Using the network topology information gathered, the links and nodes associated with that path may be determined, and the relevant set of equations associated with those links and nodes may be determined as well.

At block 508, the estimate of PTR across the relevant links and nodes is adjusted, given the PTR across the path. The adjustment of the estimate may be performed by SGD iterations, using the equations set forth above. Therefore, once the estimate is adjusted once, the iteration counter M is incremented at block 510, and at block 512, a determination is made to verify whether the predetermined number of N iterations has been reached. As long as the number of N iterations has not been reached, the estimate is adjusted at block 508. Through the iterations, the estimate for each node and link is updated in the direction of the negative gradient of the SGD until the square of the difference between the observed PTR across the path, and the PTR calculated for the path using the estimates of the PTR across the nodes and links across that path is minimized. When the difference is thus minimized, the estimate of the PTRs for the nodes and links on the paths may be determined. The estimate of the PTR is thus refined through the iterations of SGD until the per-path estimated data comes as close as possible to the value which observed in the real network. The refining through the iterations may be achieved by adjusting the learning rate of the SGD function. In some embodiments, the learning rates in successive iterations may be decayed, or become relatively smaller.

Once there are N iterations performed given the estimate on a path, then at block 514, the network failure location detection service verifies whether there are more problematic paths, or other paths for which an observed PTR is received.

In some embodiments, the inclusion of other problematic paths in the network failure location detection routine may be based on the refinement criteria applied at block 406 described with reference to FIG. 4. If there are other problematic paths, the service returns to block 506 and repeats blocks 506-512 to determine estimates for nodes and links on each of the other problematic paths. The routine iterates through blocks 506-512 until there are no other problematic paths on the network.

Then, at block 516, based on the estimates of PTR calculated for each node and link on the problematic paths observed in the network, the network failure location detection service determines the locations of the network failures by identifying the most likely links and nodes to be impaired or affected. In some embodiments, the determination may be based on the estimates for the performance characteristic on a given node or link crossing a predetermined threshold. Once the locations are determined, then the subroutine 500 ends at block 518.

Though the process described above may describe actions or events in a linear manner, the description is not meant to imply that linear execution of the process is required. One skilled in the art will appreciate that components of the process described above may be carried out in different orders than described above. In particular, such re-ordering may allow for an optimization using parallelization offered by a cloud-computing environment. As such, the description of the process above is intended to be descriptive of one example of a process for detecting locations of network failures.

Binomial Likelihood Model

In some embodiments, once the performance characteristics across paths in the network are collected and aggregated as described in conjunction with FIGS. 3 and 4, the network may be modeled using a different objective function, such as, for example, a binomial likelihood model. In the binomial likelihood model, the PTR across a given path, or $PTR_{path}$, is also represented by the product of the PTR across each entity on the path. Thus, the $PTR_{path}$ in the binomial model is also represented by the following equation:

$$PTR_{path} = \Pi_{e\ in\ path}\ PTR_e,$$

where $PTR_e$ represents the PTR across the respective entity.

Using information gathered across the paths, the PTR of a path may be an observed variable, whereas the PTR of each entity across the path cannot be observed. However, the PTR of each entity may be estimated. In addition, in the binomial model, the number of packets sent and the number of failures is also collected, in addition to the packet transfer rate on each path.

The binomial likelihood can be used to determine the probability of observing, for each path, the PTR observed given the estimate of the PTR. Then, for the entire network, the likelihood for each path is multiplied together. In order to use additive terms instead of multiplicative terms, log-likelihoods may be used instead. Therefore, the following log likelihood for the binomial model may be used to represent the value to maximize in order to arrive at the most accurate estimates for the PTR of each entity, $PTR_e$:

$$\log_e(P(PTR_{path})) = \log(P(PTR_e \mid s, f)) = \\ \log\binom{s}{f} + f \cdot \log(P(PTR_e)) + (s-f) \cdot \log(1 - P((PTR_e))),$$

where $P(PTR_p)$ is the probability of observing the observed $PTR_p$ across a path, $P(PTR_e \mid s, f)$ is the probability of the estimated PTR across an entity given the observed number of packets sent, s, and the observed number of failures, f.

Optimization of the Binomial Likelihood Model

In contrast to the least squares model, the binomial likelihood model is more adapted to be optimized using a limited memory Broyden-Fletcher-Goldfarb-Shanno algorithm extended to handle simple bounds on the model (L-BFGS-B). L-BFGS-B is a limited memory algorithm for solving large nonlinear optimization problems subject to simple bounds on the variables. The purpose of the algorithm is to minimize a nonlinear function of n variables, where the function is subject to lower and upper bounds for the variables. The BFGS algorithm generally regularizes models that assign equal probabilities across entities.

The L-BFGS is a member of the broad family of quasi-Newton optimization methods that uses a limited memory variation of the BFGS update to approximate the inverse Hessian matrix (denoted by $H_k$). Unlike the original BFGS method, L-BFGS stores only a few vectors that represent the approximation implicitly. Due to its moderate memory requirement, L-BFGS method is particularly well suited for optimization problems with a large number of variables. L-BFGS maintains a history of the past m updates of the position x and gradient $\nabla f(x)$, where generally the history m can be short, often less than 10. These updates are used to implicitly do operations requiring the $H_k$-vector product. A straightforward BFGS implementation at the i-th iteration would represent the inverse Hessian approximation as informed by all updates on 0 . . . i−1, L-BFGS does well using updates from only the most recent iterations i-m . . . i−1.

An L-BFGS shares many features with other quasi-Newton algorithms, but is very different in how the matrix-vector multiplication for finding the search direction is carried out. One common approach is the so-called "two loop recursion."

Given $x_k$, the position at the k-th iteration, and $g_k \equiv \nabla f(x_k)$ where $f$ is the function being minimized, and all vectors are column vectors. Then the updates $s_k = x_{k+1} - x_k$ and $y_k = g_{k+1} - g_k$ are kept.

$$p_k = \frac{1}{y_k^T s_k},$$

and $H_k^0$ may be defined as the 'initial' approximate of the inverse Hessian that the estimate at iteration k begins with. Then the uphill direction may be computed as follows:

q=$g_k$
For i=k−1, k−2, . . . , k−m
$\alpha_i = \rho_i s_i^T q$
q=q−$\alpha_i y_i$
z=$H_k^0$q
For i=k−m, k−m+1, . . . , k−1
$\beta_i = \rho_i y_i^T z$
z=z+$s_i(\alpha_i - \beta_i)$
Stop with $H_k g_k$=z This formulation is valid whether minimizing or maximizing. When minimizing, the search direction would be the negative of z (since z is "uphill"), and when maximizing, $H_k^0$ should be negative definite rather than positive definite.

Commonly, the inverse Hessian $H_k^0$ is represented as a diagonal matrix, so that initially setting z requires only an element-by-element multiplication.

The L-BFGS-B algorithm extends L-BFGS to handle simple box constraints on variables. The method works by identifying fixed and free variables at every step (using a simple gradient method), and then using the L-BFGS method on the free variables only to get higher accuracy, and then repeating the process.

Figure 6:
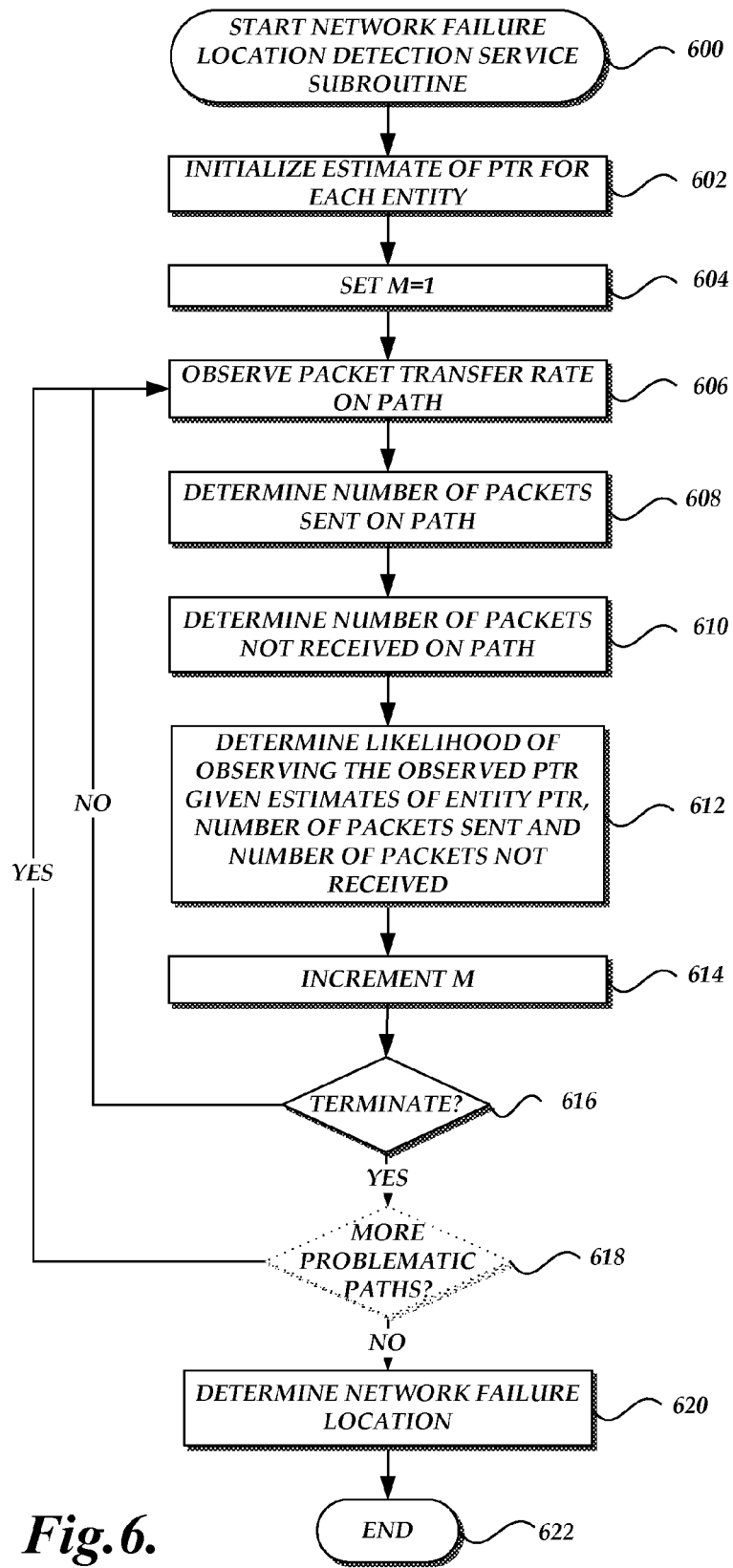
FIG. 6 is a flow diagram depicting another illustrative routine for detecting locations of network failures.

An example application of a binomial likelihood model optimized using L-BFGS-B for detecting locations of network failures is illustrated in FIG. 6, where an estimate of PTR for the entities in a network is shown. The process illustrated may also be used to solve for other performance characteristics on the nodes and links.

One skilled in the relevant art will appreciate that actions/steps outlined for routine 600 may be implemented by one or many computing devices/components that are associated with the network failure location detection component 108. Accordingly, the routine has been logically associated as being generally performed by the network failure location detection component 108, and thus the following illustrative embodiments would not be considered as limiting.

Starting at block 602, the network failure location detection component 108 initializes the estimate for PTR for each entity in the network. In some embodiments, this initialization may equate the estimate to zero. In other embodiments, the estimate may be equated to other values. For example, in some embodiments, the initial value may be set to the average value of the PTR measured across the paths in the network. In other embodiments, the initial value may be set to the median value of the performance characteristic measured across the paths in the network. In other embodiments, the initial value may be set to a specific percentile of the values of the performance characteristic measured across the paths in the network, starting from the lowest or the highest of such measured values. The percentile may be the tenth, twentieth, thirtieth, fiftieth or any other percentile. Continuing with the example of the PTR, the PTR may be initialized to being zero across all links and nodes on the network.

Once the PTR estimate is initialized on each entity, the binomial model and the L-BFGS-B algorithm may be used to refine that estimate. In some embodiments, the process may be iterated N times. N may be selected by the network operator for all cases, or it may be adjusted each time the network failure location detection subroutine is run. Referring to FIG. 6, at block 604, an iteration counter, M, is set to 1. Then, at block 606, the PTR of a path may be received.

Then, at blocks 608 and 610, the number of packets sent and the number of packets not received (or failed) on the path are determined. Then, at block 612, the likelihood of observing the observed PTR on the path given the estimates for the entity PTRs and the number of packets determined in blocks 608 and 610 is determined. Then, using the L-BFGS-B algorithm, this likelihood is optimized. Once the estimate is adjusted once, the iteration counter M is incremented at block 614, and at block 616, a determination is made as to whether to terminate the optimization of the objective function. The estimates of the parameters are adjusted as long as it is determined that the optimization should not be terminated. Through the iterations, the estimate for each entity is updated until the probability of observing the estimated PTR, given the number of packets sent and the number of packets not received, is maximized. When the probability is thus maximized, the estimate of the PTRs for the entities on the paths may be determined. The estimate of the PTR is thus refined through the iterations of L-BFGS-B.

In some embodiments, the determination of whether to terminate may include verifying whether the predetermined number of N iterations has been reached. In other embodiments, the determination of whether to terminate may be based on total time spent performing optimization, improvements observed in the objective function being optimized, relative change in parameters of the objective function between iterations (such as, for example, when improvements to the objective function on subsequent iterations fall below some threshold), or other criteria. Once it is determined to terminate the optimization of the objective function, then at optional block 618, the network failure location detection service verifies whether there are more problematic paths, or other paths for which an observed PTR is received. In some embodiments, the inclusion of other problematic paths in the network failure location detection routine may be based on the refinement criteria applied at block 406 described with reference to FIG. 4. If there are other problematic paths, the service returns to block 606 and repeats blocks 606-616 to determine estimates for entities on each of the other problematic paths. The routine iterates through blocks 606-616 until there are no other problematic paths on the network.

Then, at block 620, based on the estimates of PTR calculated for each entity on the problematic paths observed in the network, the network failure location detection service determines the locations of the network failures by identifying the most likely entities to be impaired or affected. Once the locations are determined, then the subroutine 600 ends at block 622.

Though the process described above may describe actions or events in a linear manner, the description is not meant to imply that linear execution of the process is required. One skilled in the art will appreciate that components of the process described above may be carried out different orders than described above. As such, the description of the process above is intended to be descriptive of one example of a process for detecting locations of network failures.

Beta Likelihood Model

In some embodiments, once the performance characteristics across paths in the network are collected and aggregated as described in conjunction with FIGS. 3 and 4, the network may be modeled using a different objective function, such as, for example, a beta likelihood, or beta distribution, model. Beta distributions are generally used to model uncertainty about a probability. Such probabilities with associated uncertainties are referred to as Bernoulli variables. In the beta likelihood model, the estimated PTR across each respective entity is changed from a point estimate (as used in the least squares and binomial likelihood models above) to a Bernoulli random variable. A Bernoulli random variable incorporates prior successes and failures of packet transfers for each entity as parameters of a beta distribution for the PTR of the entity. Therefore, using a beta model means that each packet is considered instead of an average PTR across a path.

Beta distributions are defined using two parameters—observed successes and failures. With no prior knowledge of a network's performance regarding successes and failures of packet transfer, when observing successes and failures for the first time, the possible PTRs can be summarized with the beta distribution: Beta (s+1, f+1), also referred to as the Beta (1,1) distribution. This beta distribution is simply the uniform distribution of the interval [0,1]. For this interval, all possible PTRs are equally likely.

If during the next 10 time intervals, 10 successful packet transfers are observed, then for the beta distribution, Beta (11, 1), the PTRs are not all equally likely. The beta distribution accommodates the incorporation of prior information about the probabilities. Therefore, as more and more successes of packet transfer are observed on a given entity, each new failure of packet transfer observed is evaluated in light of the past successes. For example, as more successes of packet transfer are observed over time, more evidence may be needed to determine that an entity is a cause of failure in the network.

The network may be modeled by the cumulative distribution function of the beta likelihood as follows:

$$F(x; s, f) = \frac{B(x; s, f)}{B(s, f)} = I_x(s, f),$$

where $B(x;s,f)$ is the incomplete beta function and $I_x(s,f)$ is the regularized incomplete beta function.

The incomplete beta function, $B(x;s,f)$ may be represented by:

$$B(x; s, f) = \int_0^x t^{s-1}(1-t)^{f-1}\,dt$$

and the regularized incomplete beta function may be represented by:

$$I_x(s, f) = \sum_{j=s}^{s+f-1} \frac{(s+f-1)!}{j!(s+f-1-j)!} x^j (1-x)^{s+f-1-j}$$

The successful packet transfers can be readily observed. However, the failure of packet transfer is not observable, since it is not known which is the entity causing the packet drop. Therefore, the beta likelihood model needs to be optimized to solve for the beta parameters of success and failure.

Optimization of the Beta Likelihood Model

The beta likelihood model above can be optimized using expectation maximization (EM). The expectation-maximization (EM) algorithm is an iterative method for finding maximum likelihood or maximum a posteriori (MAP) estimates of parameters in statistical models, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found on the (E) step. These parameter-estimates are then used to determine the distribution of the latent variables in the next (E) step.

Figure 7:
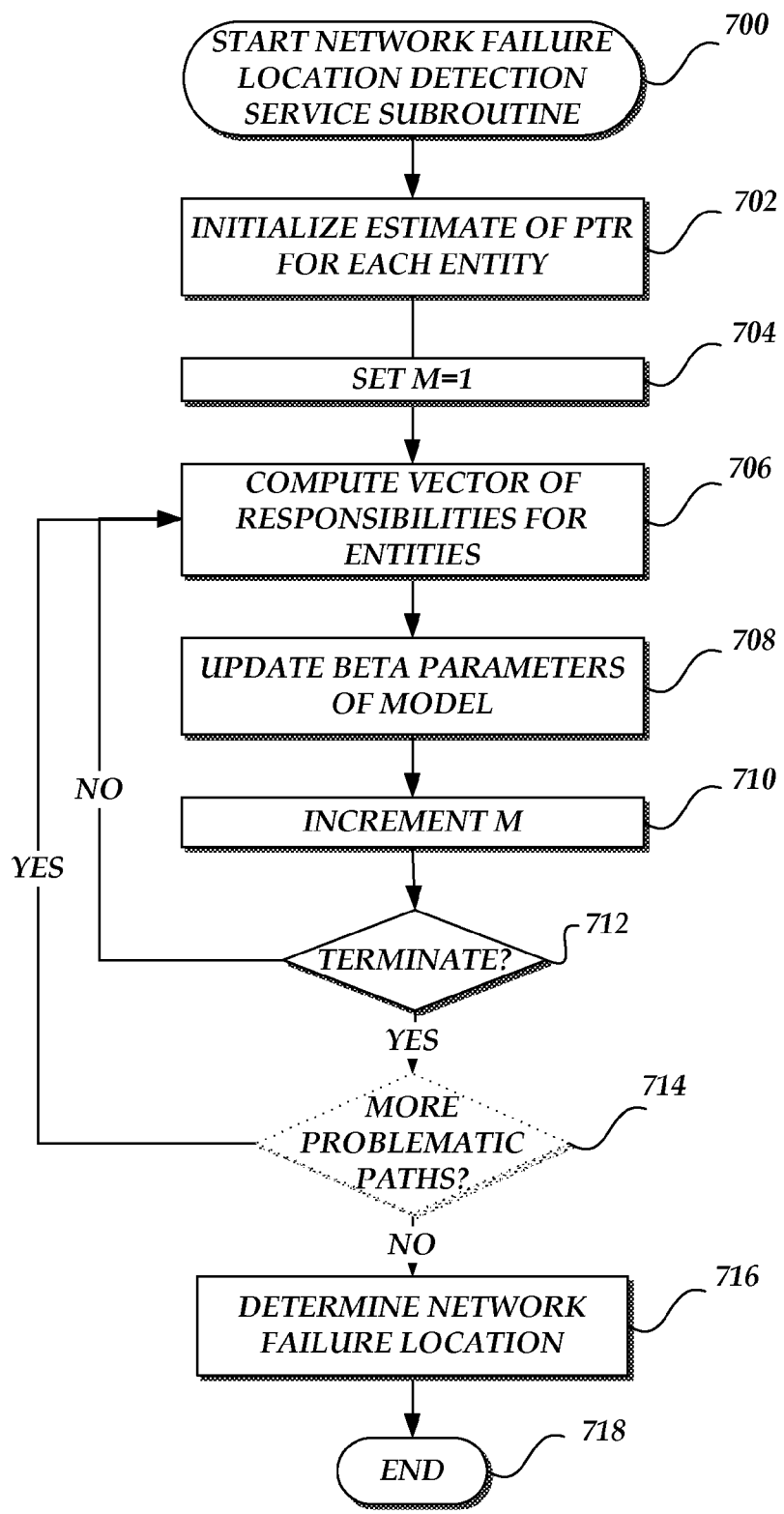
FIG. 7 is a flow diagram depicting another illustrative routine for detecting locations of network failures.

An example application of the beta likelihood model optimized using EM is illustrated in FIG. 7. FIG. 7 is a flow diagram depicting an illustrative subroutine 700 for detecting locations of network failures. One skilled in the relevant art will appreciate that actions/steps outlined for routine 700 may be implemented by one or many computing devices/components that are associated with the network failure location detection component 108. Accordingly, the routine has been logically associated as being generally performed by the network failure location detection component 108, and thus the following illustrative embodiments would not be considered as limiting.

In FIG. 7, an estimate of PTR for the entities in a network is shown. The process illustrated may also be used to solve for performance characteristics other than PTR on the nodes and links.

Starting at block 702, the network failure location detection component 108 initializes the estimate for PTR for each entity in the network. To solve the beta likelihood model above, as the initialization block 702, the failures are spread evenly among the entities on the path. At the end of the initialization block 702, an entity's beta parameters are the number of successful packet transfers it participated in, and some fraction of all the failures it participated in. In some aspects, no prior failures may be assumed during initialization. After initialization, the routine alternates between expectation and maximization.

In some embodiments, the process may be iterated N times. N may be selected by the network operator for all cases, or it may be adjusted each time the network failure location detection subroutine is run. In some embodiments, optimization may be terminated once improvements to the objective function fall below a pre-defined threshold. Referring to FIG. 7, at block 704, an iteration counter, M, is set to 1.

Then the subroutine moves to the block 706, the expectation step of the EM algorithm, where, for each path, a vector of responsibilities is computed, which assigns blame for each lost packet to the entities on the path. The responsibility for a given entity is simply the mean of the beta distribution given by the entity's current parameter estimates. However, the means of all of the beta distributions will not sum to 1, and therefore the responsibility for each given entity must be normalized by dividing each responsibility by the sum of the means, so that the totals add to 1.

Then, the subroutine moves to block 708, the maximization step of the EM algorithm, where the responsibilities are used to update the beta parameters of the model. In contrast to the initialization step at block 702, here, the failures are not evenly spread among the entities. Each entity gets assigned a fractional amount of failure according to the responsibilities determined. In the maximization step at block 708, the maximum likelihood beta parameters are being chosen given the data and the responsibilities.

Then, once the estimate is adjusted once, the iteration counter M is incremented at block 710, and at block 712, a determination is made as to whether to terminate the optimization of the objective function. The estimates of the parameters are adjusted as long as it is determined that the optimization should not be terminated. The expectation and maximization steps to increase the log likelihood of the model given the data at each iteration. When the algorithm is converged, the final estimated entity $PTR_e$s are set to the mode of their final beta distribution. This is the maximum a posteriori (MAP) estimate.

In some embodiments, the determination of whether to terminate may include verifying whether the predetermined number of N iterations has been reached. In other embodiments, the determination of whether to terminate may be based on total time spent performing optimization, improvements observed in the objective function being optimized, relative change in parameters of the objective function between iterations, or other criteria. Once it is determined to terminate the optimization of the objective function, then at optional block 714, the network failure location detection service verifies whether there are more problematic paths, or other paths for which an observed PTR is received. In some embodiments, the inclusion of other problematic paths in the network failure location detection routine may be based on the refinement criteria applied at block 406 described with reference to FIG. 4. If there are other problematic paths, the service returns to block 706 and repeats blocks 706-712 to determine estimates for entities on each of the other problematic paths. The routine iterates through blocks 706-712 until there are no other problematic paths on the network.

Then, at block 716, based on the estimates of PTR calculated for each entity on the problematic paths observed in the network, the network failure location detection service determines the locations of the network failures by identifying the most likely entities to be impaired or affected. Once the locations are determined, then the subroutine 700 ends at block 718.

Though the process described above may describe actions or events in a linear manner, the description is not meant to imply that linear execution of the process is required. One skilled in the art will appreciate that components of the process described above may be carried out in different orders than described above. As such, the description of the process above is intended to be descriptive of one example of a process for detecting locations of network failures.

Independence Assumption

The above models and optimization techniques are based on a core independence assumption. The independence assumption treats all paths and packets on the network identically. In some embodiments, the independence assumption may be removed, and the aggregated information collected from the network may be processed using standard, or Z-scores instead of modeling and optimization techniques such as the ones described above. In some other embodiments, the aggregated information may be processed by combining the results found by modeling and optimization with those found using standard or Z-scores.

Z-Scores

When the network failure location detection is constrained by an independence assumption, it may be difficult to detect certain types of failures. For example, if a device drops packets on only a fraction of the paths, and not on other paths, such a failure may be difficult to locate when operating under the independence assumption. Therefore, the models and algorithms described above may not be appropriate to identify locations of such failures.

The z-test for proportions is a statistical test used to determine when two proportions are different given a number of trials observed. In general, a z-test would be appropriate to draw attention to devices which may be overrepresented on lossy paths of the network. For example, it would be possible to find all paths on the network where heavy losses are observed. In some embodiments, heavy losses may include more than 5% of packets being dropped. In other embodiments, the percentage of packets being dropped may be different. Then, it would be possible to determine which devices appear on those paths with heavy losses, and to determine the probability of the devices appearing on the paths. Then, using z-scores, it can be determined whether certain devices appear on lossy paths unnaturally often. If so, the network failure may be determined to be located on those devices determined to be appearing unnaturally often on lossy paths.

Combination of Models/Algorithms with Z-Scores

In various embodiments, it may be useful to combine the z-scores with the PTR (or other performance characteristic) estimates solved using one or more of the models/algorithms described above. The combination may include normalizing the scores and estimates into a common space. For example, one embodiment may include normalizing both the scores and the estimates to represent numbers within the same range. The range may include numbers between 0 and 1, or between 0 and 100, or any other numerical range. The normalized numbers may be combined together by summing, or any another form of mathematical equation. The normalized numbers may also be converted to other representations including letters, symbols, icons and the like.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for detecting locations of network failures, the method comprising:
   representing a network using a binomial likelihood function;
   measuring a packet transfer rate across each of a plurality of network paths in the network respectively, wherein each one of the network paths includes at least two nodes and at least one link;
   for at least one path among the plurality of network paths, determining a respective packet transfer rate for each of the at least two nodes and the at least one link included in the at least one path by applying a limited memory Broyden-Fletcher-Goldfarb-Shanno with bound constraints (L-BFGS-B) algorithm to update a respective estimate of the respective packet transfer rate for each of the at least two nodes and the at least one link based on the measured packet transfer rate across the at least one path: and determining at least one location for at least one network failure based on the determined respective packet transfer rate for each of the at least two nodes and the at least one link included in the at least one path.

2. The method of claim 1, wherein determining a respective packet transfer rate for each of the at least two nodes and the at least one link in the at least one path comprises:

initializing an estimate for the respective packet transfer rate for each of the at least two nodes and the at least one link;

determining a number of packets sent on the at least one path;

determining a number of packets not received on the at least one path;

determining a likelihood of observing the measured packet transfer rate across the at least one path given the respective estimates for the respective packet transfer rate for the at least two nodes and the at least one link in the at least one path, the determined number of packets sent and the determined number of packets not received; and updating the respective estimates for the respective packet transfer rates for the at least two nodes and the at least one link, using the limited memory Broyden-Fletcher-Goldfarb-Shanno with bound constraints (L-BFGS-B) algorithm, based on the likelihood determined.

3. The method of claim 2, wherein initializing the estimate for the respective packet transfer rate is based on the measured packet transfer rate across the at least one path.

4. The method of claim 2, wherein determining a likelihood of observing the measured packet transfer rate is repeated for a number of iterations.

5. The method of claim 2, wherein the binomial likelihood function comprises the likelihood of observing the determined number of packets sent and the determined number of packets not received on the at least one path given the measured packet transfer rate across the at least one path.

6. The method of claim 2, further comprising:

processing the measured packet transfer rate across the at least one path using z-scores.

7. The method of claim 6, wherein using z-scores comprises:

determining a respective packet transfer rate for each of the at least two nodes and the at least one link included in the at least one path; and determining if the respective packet transfer rate exceeds a predetermined threshold on the at least one path.

8. The method of claim 1, further comprising:

storing the measured packet transfer rates, the determined respective packet transfer rates, and the determined at least one location.

9. The method of claim 1, further comprising:

making available for display the determined at least one location.

10. A system for detecting locations of network failures, the system comprising:

a network failure location detection component comprising one or more computing devices configured to execute specific instructions, the network failure location detection component operable to:

represent a network using a binomial likelihood model;

measure a communication attribute across each of a plurality of network paths in the network respectively, wherein each one of the network paths includes at least two nodes and at least one link;

for at least one path among the plurality of network paths, determine a respective communication attribute for each of the at least two nodes and the at least one link included in the at least one path by applying a limited memory Broyden-Fletcher-Goldfarb-Shanno with bound constraints (L-BFGS-B) algorithm to update a respective estimate of the respective communication attribute for each of the at least two nodes and the at least one link based on the measured communication attribute across the at least one path; and determine at least one location for at least one network failure based on the determined respective communication attributes associated with the at least two nodes and the at least one link included in the at least one path.

11. The system of claim 10, wherein the communication attribute is at least one of a packet transfer rate, a loss, or a packet loss rate.

12. The system of claim 10, wherein the communication attribute is at least one of jitter and latency.

13. The system of claim 10, wherein the network failure location detection component is further operable to process the measured communication attribute across the at least one path using z-scores.

14. The system of claim 10, wherein the network failure location detection component is operable to determine at least one location for at least one network failure based on the determined respective communication attributes by identifying at least one node or link with a determined respective communication attribute above a predetermined threshold.

15. The system of claim 10, wherein the at least one path is a subset of the plurality of network paths.

16. The system of claim 15, wherein the subset of the plurality of network paths is determined based on the respective communication attribute measured across each of the plurality of network paths.

17. A non-transitory, computer-readable medium having a computer-executable component, the computer-executable component comprising:

a network failure location detection component for:

representing a network using a binomial likelihood function;

measuring a communication attribute across each of a plurality of paths in the network respectively, wherein each path includes at least two nodes and at least one link, and wherein the communication attribute is indicative of a network failure;

for at least one path among the plurality of network paths, determining a respective communication attribute for each of the at least two nodes and the at least one link included in the at least one path by applying a limited memory Broyden-Fletcher-Goldfarb-Shanno with bound constraints (L-BFGS-B) algorithm to update a respective estimate of the respective communication attribute for each of the at least two nodes and the at least one link based on the measured communication attribute across the at least one path; and determining at least one location for the network failure based on the respective determined communication attributes associated with the at least two nodes and at least one link on the at least one path.

18. The non-transitory, computer-readable medium of claim 17, wherein determining at least one location for the network failure comprises determining an entity with a respective communication attribute beyond a predetermined threshold.

* * * * *